United States Patent [19]

Denier et al.

[11] E Re. 28,455

[45] Reissued July 1, 1975

[54] PORTABLE ELEVATOR WORKING AND LOAD-LIFTING PLATFORM

[75] Inventors: Howard H. Denier; Dennis J. Denier; Thomas Hedger, all of Cincinnati; Lee R. Garrett, Hamilton, all of Ohio

[73] Assignee: Howard H. Denier, Cincinnati, Ohio

[22] Filed: Aug. 2, 1973

[21] Appl. No.: 385,078

Related U.S. Patent Documents

Reissue of:

[64] Patent No.: 3,596,735
Issued: Aug. 3, 1971
Appl. No.: 872,542
Filed: Oct. 30, 1969

[52] U.S. Cl. ..... 182/16; 182/63; 182/148

[51] Int. Cl. ..... E04g 1/22

[58] Field of Search ..... 182/12, 13, 16, 17, 63, 182/141, 148; 91/459; 321/45 C; 254/122

[56] References Cited

UNITED STATES PATENTS

| | | | |
|---|---|---|---|
| 2,402,579 | 6/1946 | Ross | 182/63 |
| 2,471,901 | 5/1949 | Ross | 182/63 |
| 2,935,218 | 5/1950 | Fritz | 182/63 |
| 3,015,497 | 1/1962 | Aldred | 182/17 |
| 3,236,329 | 2/1966 | Price | 182/14 |
| 3,250,978 | 5/1966 | Moscardi | 321/45 C |
| 3,341,042 | 9/1967 | Carder | 182/148 |
| 3,352,380 | 11/1967 | Barney | 182/148 |
| 3,379,279 | 4/1968 | Slusher | 182/14 |
| 3,502,172 | 3/1970 | Ismond | 182/63 |

*Primary Examiner*—Reinaldo P. Machado
*Attorney, Agent, or Firm*—Wood, Herron & Evans

[57] ABSTRACT

The invention teaches the use of a hydraulic system having primary ram booster means to start the raising of a platform coacting with other ram means to raise and lower the platforms. The platform is raised and lowered by remote control by a workman on the platform and it also can be raised and lowered by any one not on the platform. It utilizes a vehicle for the platform having a usual controlled rectified electric circuit for a motorized driving means for the vehicle that prevents the drive motor attaining maximum speed when the platform is slightly raised above the chassis and permits the drive motor to attain maximum speed when the platform is completely collapsed down on the chassis. It is steered while in motion in any desired direction, hydraulically under remote control by the workman while the platform is at either its lowest or uppermost position.

33 Claims, 16 Drawing Figures

INVENTOR.
HOWARD H. DENIER, DENNIS J. DENIER,
THOMAS HEDGER & LEE R. GARRETT.
BY
Georgel Schwenger
ATTORNEY.

INVENTOR.
HOWARD H. DENIER, DENNIS J. DENIER,
THOMAS HEDGER & LEE R. GARRETT.
BY
George A. Schwenger
ATTORNEY.

INVENTOR.
HOWARD H. DENIER, DENNIS J. DENIER
THOMAS HEDGER & LEE R. GARRETT.
BY
George A. Schwenger
ATTORNEY INVENTOR.
HOWARD H. DENIER, DENNIS J. DENIER,
THOMAS HEDGER & LEE R. GARRETT.
BY George A. Schwenger
ATTORNEY INVENTOR.
HOWARD H. DENIER, DENNIS J. DENIER,
THOMAS HEDGER & LEE R. GARRETT.
BY
George A. Schwenzer
ATTORNEY INVENTOR.
HOWARD H. DENIER, DENNIS J. DENIER,
THOMAS HEDGER & LEE R. GARRETT.
BY
George A. Schweizer
ATTORNEY INVENTOR.
HOWARD H. DENIER, DENNIS J. DENIER,
THOMAS HEDGER & LEE R. GARRETT.
BY
George C. Schwenzer
ATTORNEY INVENTOR.
HOWARD H. DENIER, DENNIS J. DENIER,
THOMAS HEDGER & LEE R. GARRETT.
BY
George C. Schwinger
ATTORNEY.

INVENTOR.
HOWARD H. DENIER, DENNIS J. DENIER,
THOMAS HEDGER & LEE R. GARRETT.
BY
George A. Schuenzer
ATTORNEY.

INVENTORS
HOWARD H. DENIER, DENNIS J. DENIER
THOMAS HEDGER & LEE R. GARRETT
BY
George C. Scheer
ATTORNEY INVENTOR.
HOWARD H. DENIER, DENNIS J. DENIER,
THOMAS HEDGER & LEE R. GARRETT.
BY
George G. Schwarz
ATTORNEY

PORTABLE ELEVATOR WORKING AND LOAD-LIFTING PLATFORM

Matter enclosed in heavy brackets [ ] appears in the original patent but forms no part of this reissue specification; matter printed in italics indicates the additions made by reissue.

---

It is an object of the invention to provide a platform for workmen that can be raised and lowered and held hydraulically at any height in beween the upper and lowest limits of the elevating mechanism by remote pushbutton control by the workmen on the platform.

It is an object of our invention to provide a primary hydraulically actuated means to initially start the raising of the platform to an opportune height and continue the raising of the platform by coaction of a secondary hydraulically actuated elevating means.

It is the object of the invention to provide a silicon-controlled rectified electric circuit, for the motorized driving means, that is remotely controlled by the workmen on the platform whereby the speed of travel of the platform is gradually accelerated and/or deaccelerated to a desirable gradual movement in either direction and travel, speed, braking or plugging and directional change are accomplished by a single control lever for any direction of movement of the platform.

It is another object of our invention to provide a movable stabilizing hydraulic outrigger means to secure the platform in vertical nontilting position while in stationary position and while in motion from place to place while platform is in the highest or lowest elevated position.

Another object is to control the speed of travel of the platform when it is raised slightly above its chassis and/or in its highest elevation.

These and other objects will become apparent from the description and the drawings illustrating the preferred embodiment of our invention.

IN THE DRAWINGS

Figure 8:
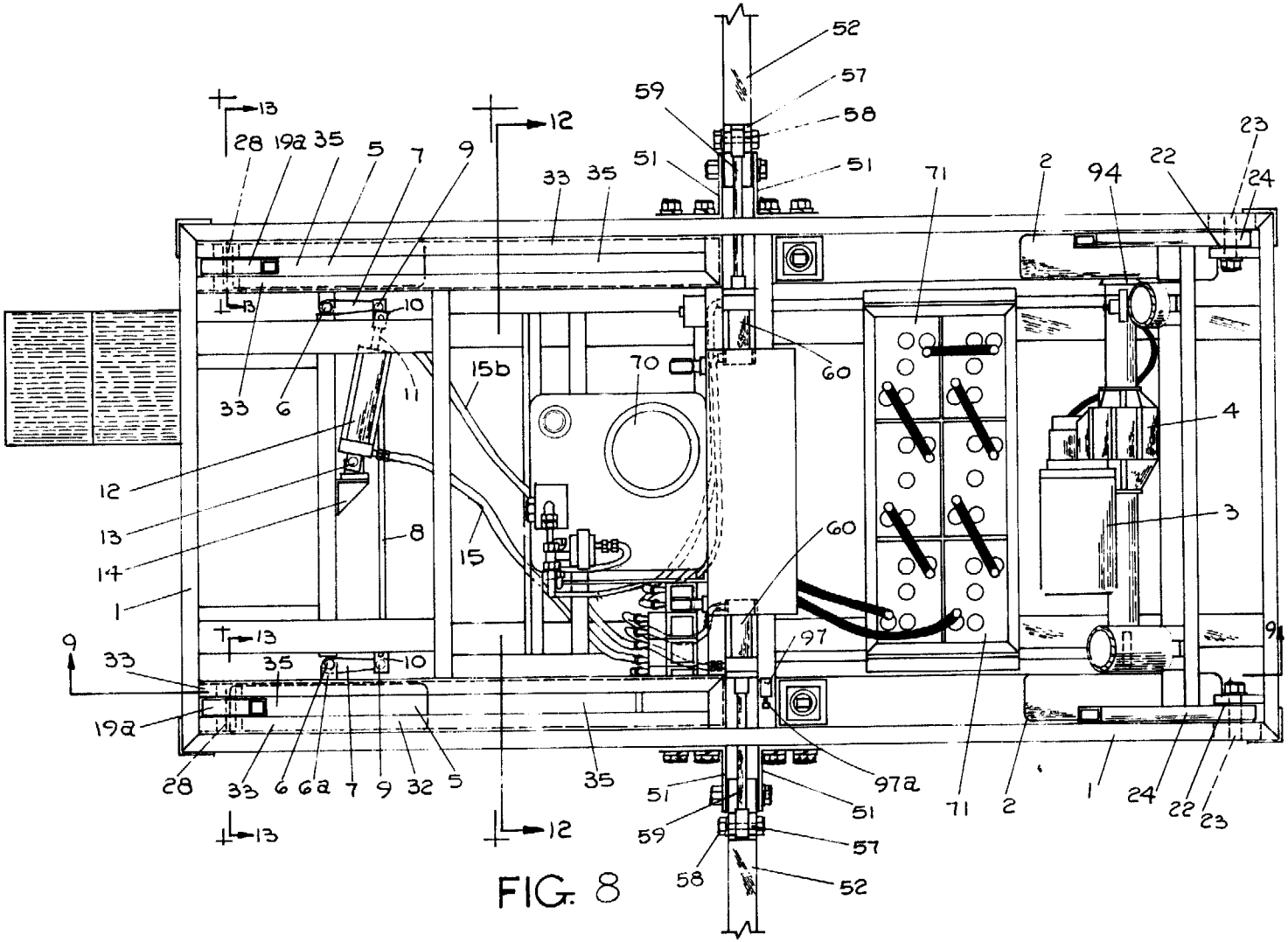
FIG. 8 is a top plan view of our carriage for the platform taken on line 8—8 of FIG. 6.
Figure 9:
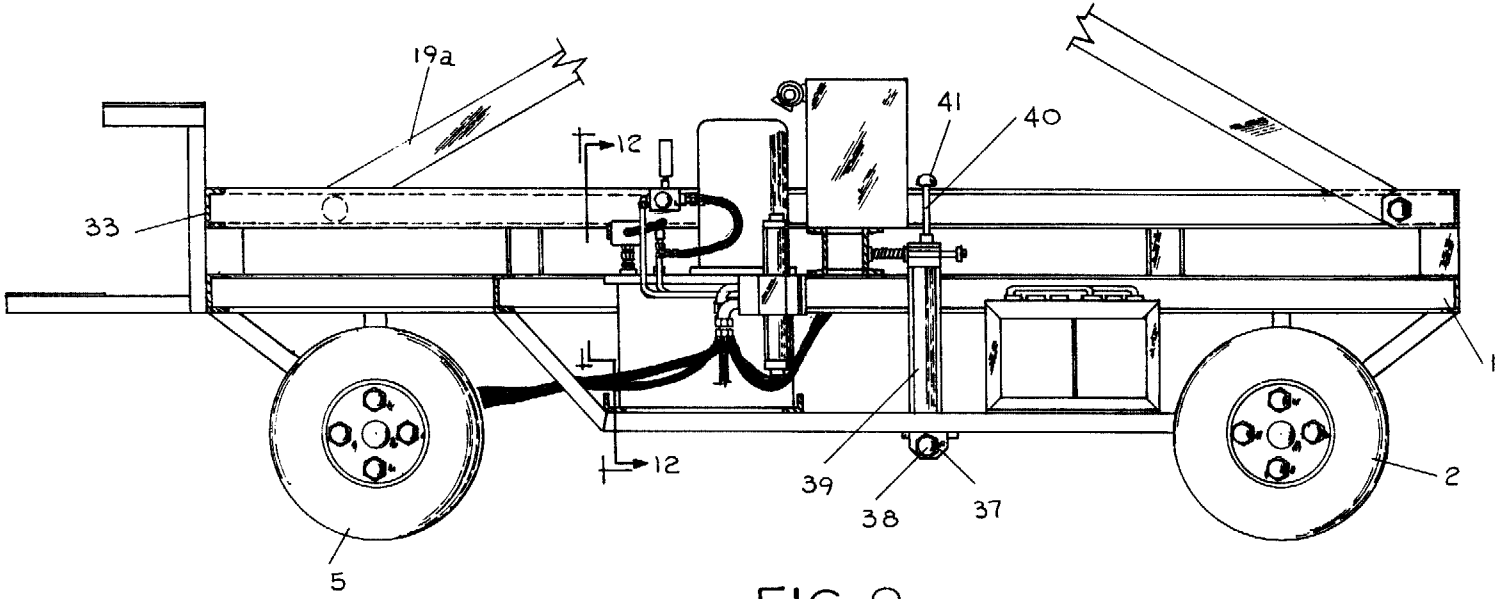
FIG. 9 is a side view in section taken on line 9—9 of FIG. 8 with a fragment of the lazy tongs.

In the preferred form our portable elevator platform has a chassis frame 1 for a vehicle formed from structural shapes that is movably supported on rubber-tired drive wheels. Wheels 2 of the vehicle are driven by a drive motor 3 directly connected to a differential gear drive and housing 4 fixed on the chassis (see FIG. 8). An electromagnetic safety brake is attached to the drive to hold the vehicle stationary. The acceleration or the deacceleration of movement of the platform is controlled electrically (to be explained) so that starting and/or stopping of the motor drive is gradual thereby preventing any jerking motion during starting or stopping the movement of our portable elevator platform. Other rubber-tired steering wheels 5 for the vehicle are dirigible and are pivoted on pivot kingpins 6 and provide the means for steering the platform. The kingpins are connected together by a spanner bar to prevent the wheels from tilting out of a vertical plane. The pivot kingpins 6 are connected to a front axle 6a (see FIG. 8). Cranks 7 secured to the front axle are connected together by a tie rod 8 that is pivotally connected to the cranks on pins 9 that are fixed in a bifurcated link 10. Pivotally connected to the tie rod there is a piston rod 11 that is actuated by a hydraulic steering cylinder 12. When the piston rod moves to the left the vehicle will steer to the right and when it moves to the right the vehicle will steer to the left. This cylinder is pivotally secured on a pin 13 that is secured on a bracket 14 that in turn is fixed on the chassis frame 1 of the vehicle. Hydraulic hose lines 15 and 15b to the steering cylinder are connected to a solenoid-actuated four-way valve 15a, to be explained (see FIG. 16).

Figure 13:
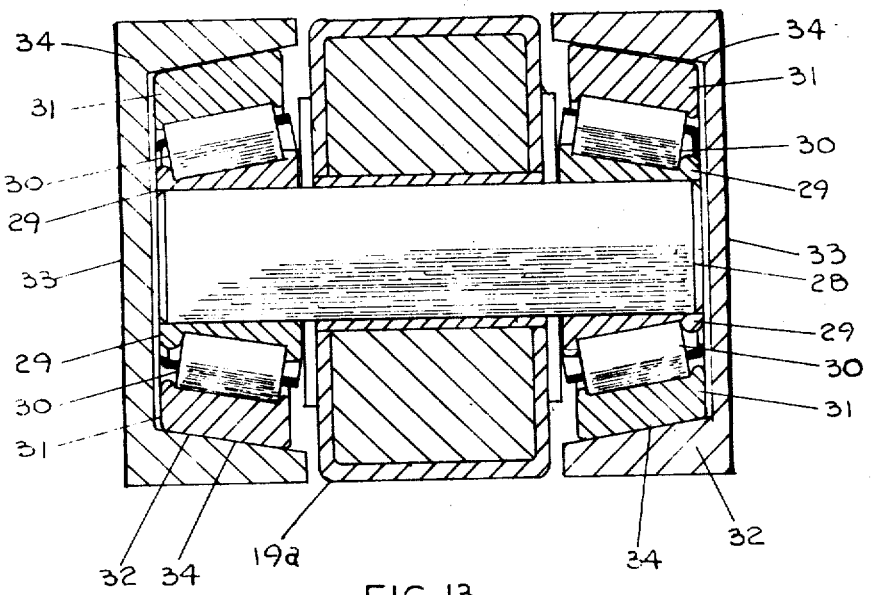
FIG. 13 is a typical sectional view taken on line 13—13 of FIGS. 7, 8 and 9 showing the bearing the channels on the chassis and underside of the platform.
Figure 14:
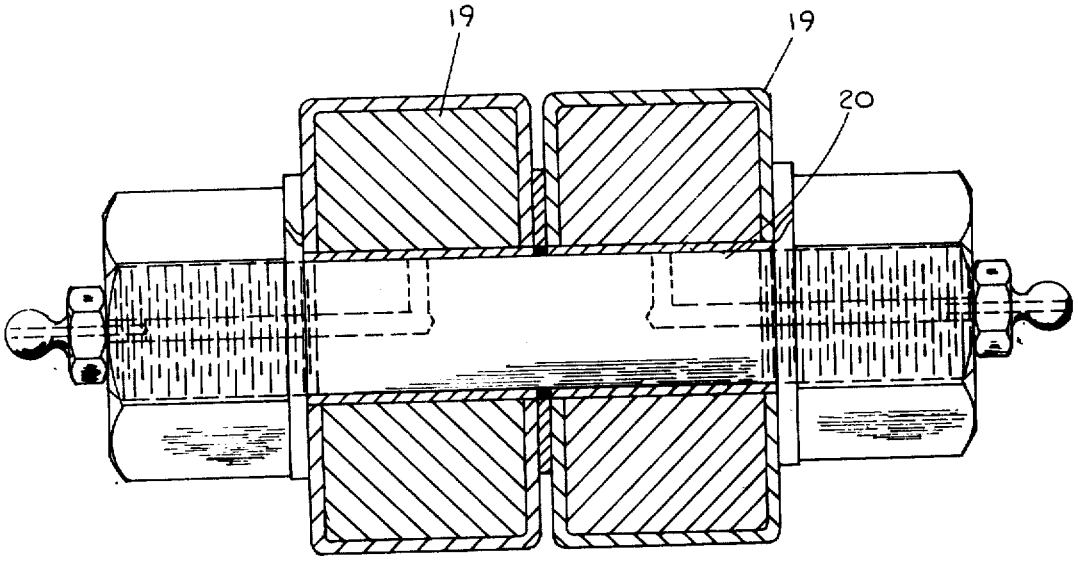
FIG. 14 is a fragmentary view of a typical sectional view showing a typical joint on the lazy arms.

A platform 16 for workmen and materials with guard rails 17 is raised and lowered by collapsible and expandable by a compound lever system or lazy tongs frames 18 composed of a multiple of bars 12 which operate in scissor fashion. Bars 19 are pivotal connected at their ends by pins 20 and other pins 21 at their centers to form lazy tongs. Fixed in the chassis there are bearings 22 for studs 23 upon which lower ends 24 of the bars are rotatably supported. These ends of the lazy tongs do not move in relation to the chassis. Other pins 25 are fixed in a base 26 of the platform and rotatably secure upper ends 27 of bars 19 of the lazy tongs to the platform. These ends do not move in relation to the platform. Secured in the bottom ends 19a of the bars 19 there are shafts 28 (see FIG. 13) upon which inner races 29 of roller bearings 30 are fixed. Rotatable outer races 31 of the roller bearings rotate on flanges 32 of spaced channels 33 that are fixed on and are part of the chassis. These channels form slots 35 between them for the bottom ends 19a of the lazy tongs. Outer perimeters 34 of the outer races are tapered thereby creating a horizontal thrust on both sides of the ends of the bars 19a and keep the ends of the bars slidably and centrally within the slots 35, when the lazy tongs frames are extending or collapsing. These ends move in relation to the chassis when the lazy tongs frames are extending or collapsing.

Secured to the underside of the platform on both sides there are other channels 36 to movably retain other roller bearings 30a that are mounted on ends 19b of the upper bars of the lazy tongs. These roller bearings are mounted in the same manner as explained for the roller bearings that are retained in the channels n the chassis. This construction allows the upper ends 19b to move in relation to the platform while the lazy tongs are raising and/or lowering the platform.

Figure 6:
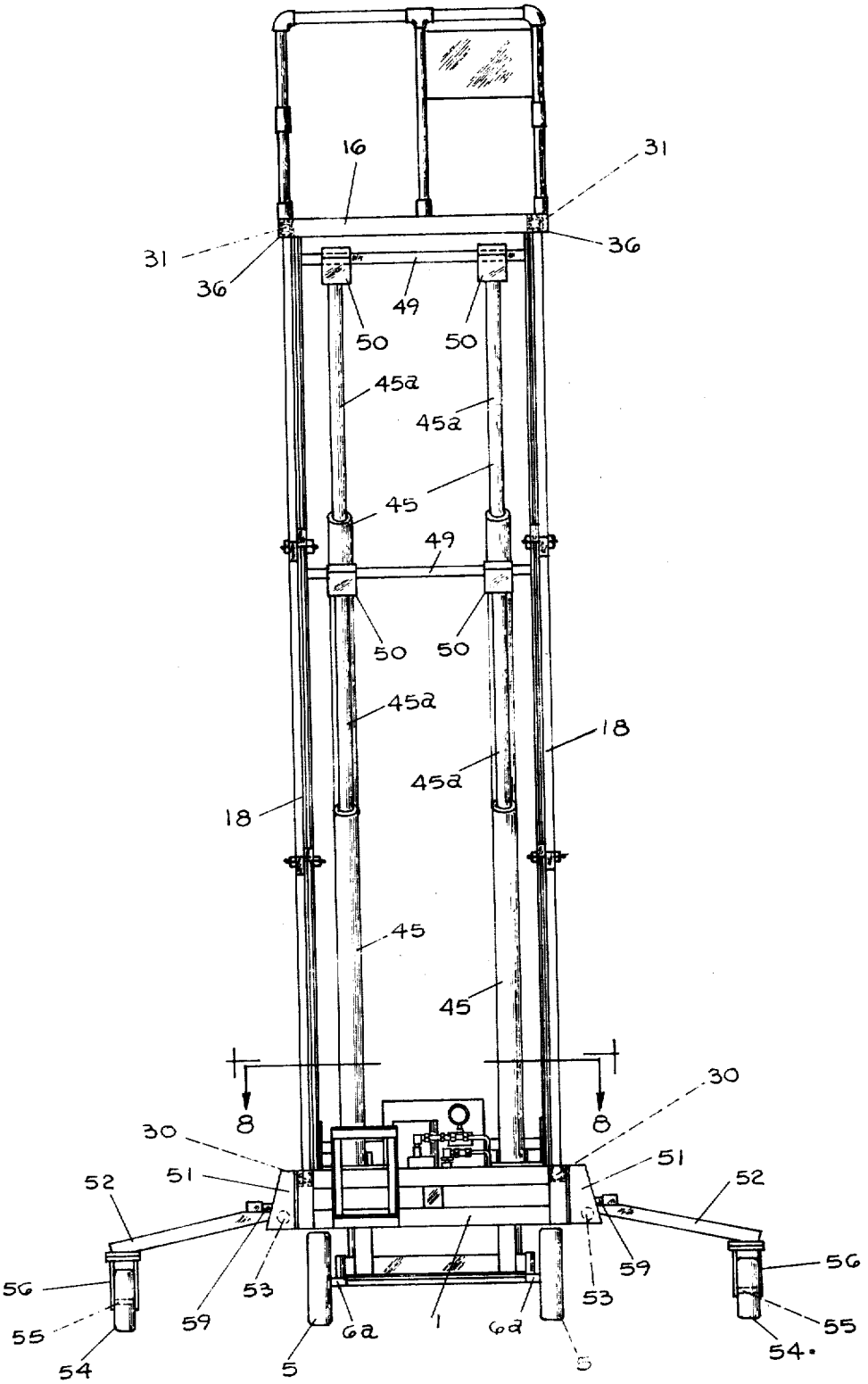
FIG. 6 is an end view in elevation showing the platform at its highest level with the stabilizing outriggers down in position to prevent tilting of the platform.
Figure 7:
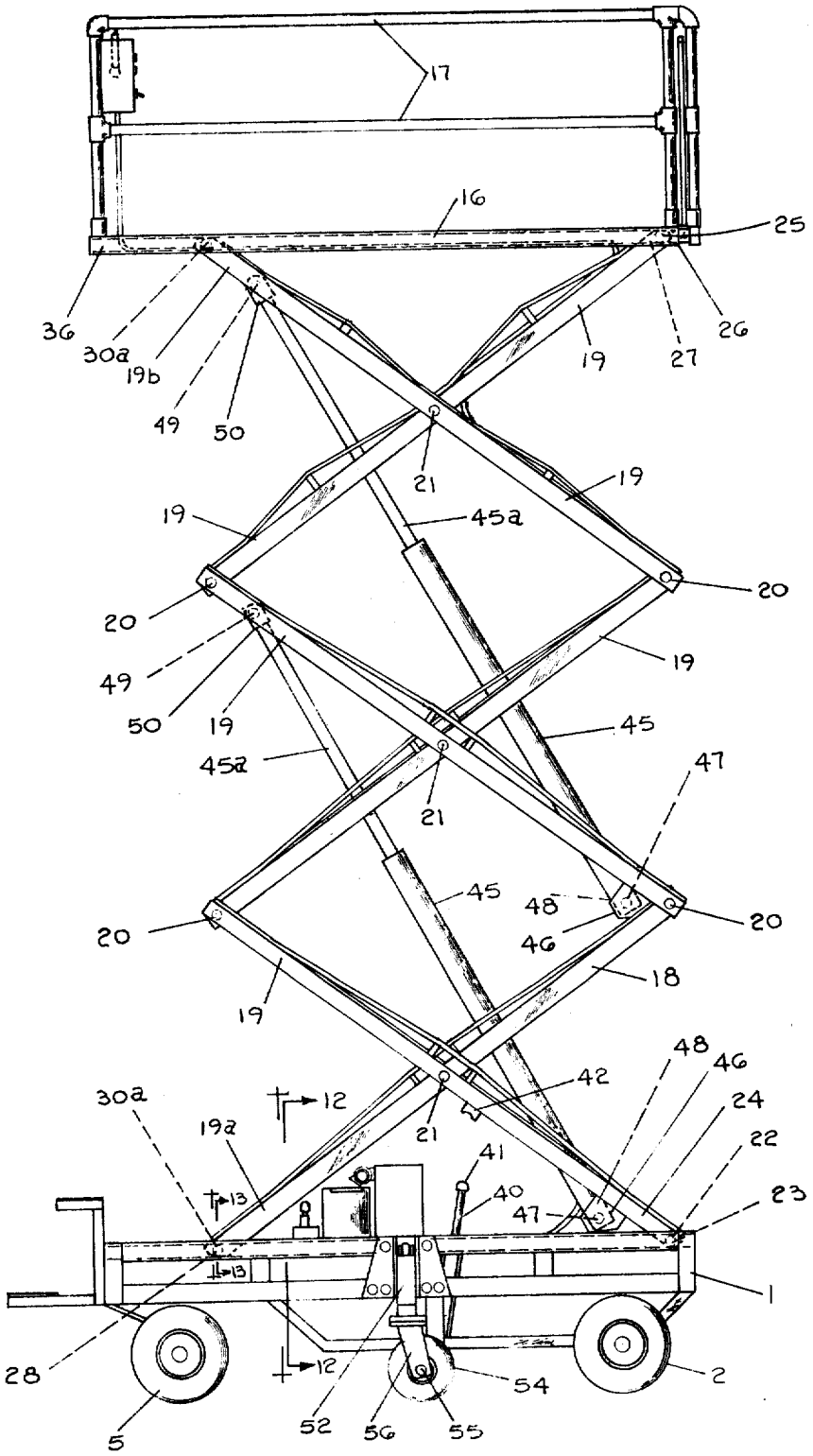
FIG. 7 is a side view in elevation showing a platform at its highest level with the stabilizing outriggers down in position to prevent the tilting of the platform.
Figure 10:
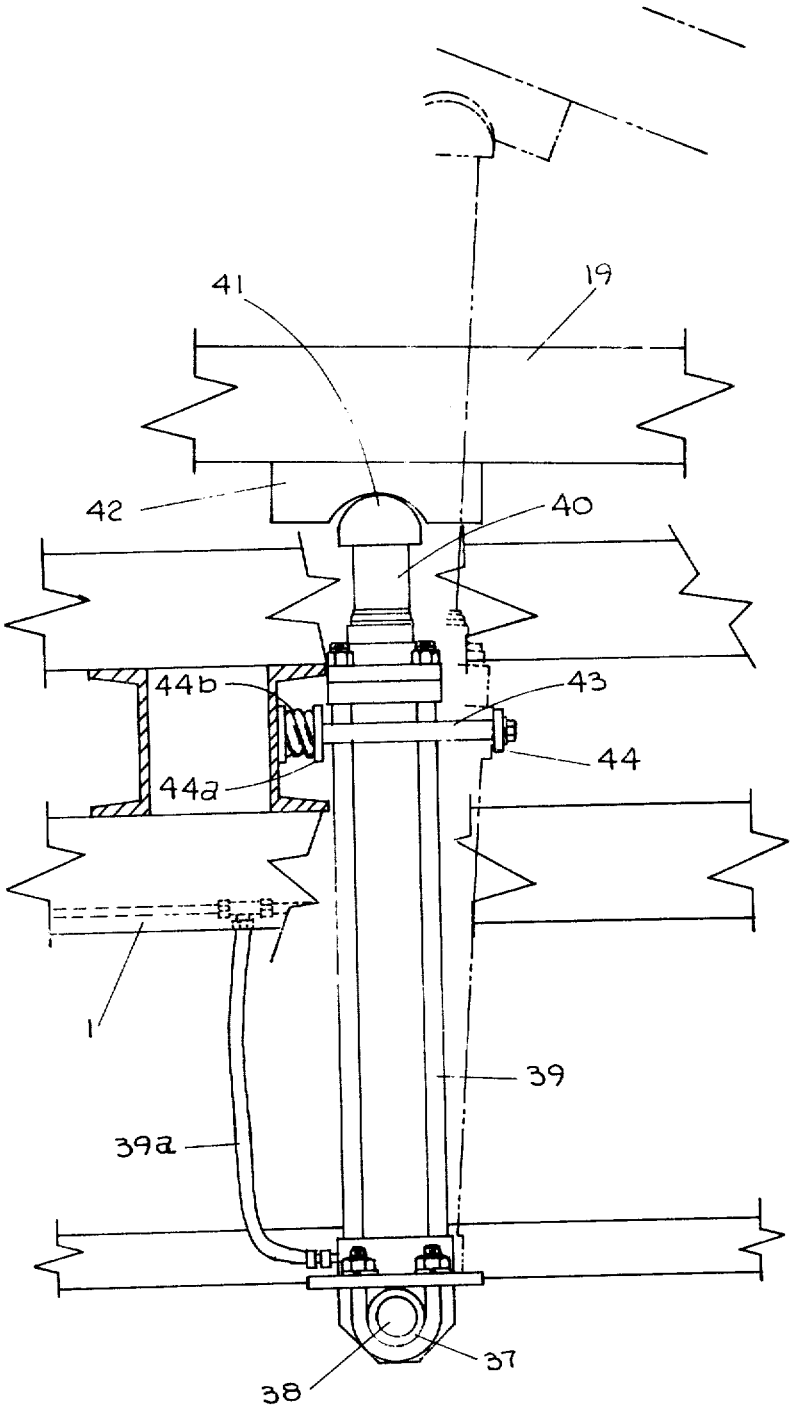
FIG. 10 is a fragmentary view in elevation of a hydraulic booster ram.
Figure 11:
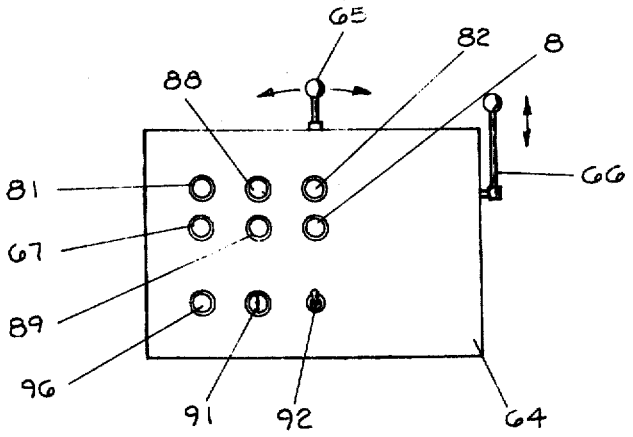
FIG. 11 is a front view in elevation of the pushbutton control panel.

The lazy tongs are actuated by a hydraulic system consisting of primary booster rams and secondary hydraulic rams (see FIGS. 6 and 7). Secured to and fixed by saddle bolts on bottom frame members of the chassis there are bearings 37 for booster hydraulic cylinders 39 on both sides of the chassis (see FIG. 10). Shaft 38 are rotatably mounted in the bearings 37. Fixed on the shaft are the hydraulic booster cylinders 39 that are rotatable with the shaft 38. The booster cylinders have piston rams 40 terminating in hemispherical heads 41. The booster cylinders have hydraulic hose lines 39a and 39b connected to a common hydraulic supply and return line 39c that functions as a supply line and return line for hydraulic fluid to the booster cylinders and secondary hydraulic cylinders (to be explained). The booster cylinders have limited rotation as indicated by dotted lines in FIG. 10 during the initial upward movement of the lazy tongs bars. Secured to lower rods 19 there are concave blocks 42 (see FIG. 7) adapted to removably engage over the hemispherical heads 41 during the collapsing of the lazy tongs to move the booster cylinder and piston rams back into a vertical position and thereby have the booster cylinders and piston rams in position to assist in the next elevation of the platform. The booster rams act on the lazy tongs in advance of action by the secondary rams (to be explained) when the platform is being raised.

Secured to the chassis there are stationary round rods 43 on each side of the booster cylinders. At the outer ends of the rods there are stop plates 44 that limit the outward rotation of the booster cylinders. Slidably mounted on the rods 43 there are pusher plates 44a which are forced into engagement with the booster cylinder by coil springs 44b. These bars and springs ensure the indexing of the concave blocks over the hemispherical heads on the booster rams when the lazy tongs are collapsing and are collapsed into the lowest position in relation to the chassis.

Figure 12:
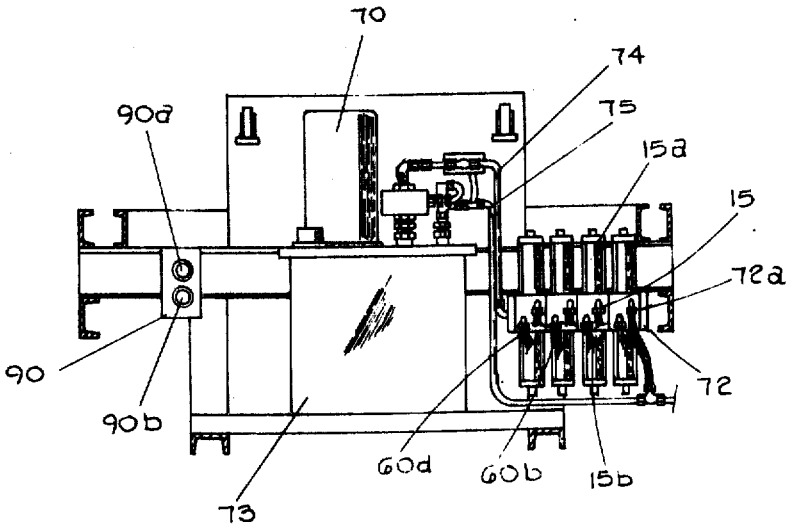
FIG. 12 is a section through a chassis of the carriage taken on line 12—12 of FIGS. 7, 8 and 9 showing the hydraulic pump, reservoir and manifold.

There are two sets of secondary hydraulic cylinders 45 with rams 45a. Secured and fixed to the bars of the lazy tongs there are other angle plates 46 in which are secured other bearing pins 47. Bottoms 48 of the second hydraulic cylinders 45 are rotatably secured on the pins 47. Extending between and fixed in the lazy tongs bars there are other shafts 49 for rotatably securing head castings 50 that are fixed on the secondary hydraulic cylinder rams 45a. These secondary hydraulic cylinder rams, together with the booster rams, cause the lazy tongs to move the platform upward easily and smoothly. The secondary hydraulic cylinders have hydraulic hose lines 45b connected to the common supply and return line 39c. The common supply and return line is connected to a solenoid-actuated valve 45c. there are a multiple of solenoid-actuated valves 72 secured to the chassis (see FIG. 12) having a manifold 72a for selective distribution of the hydraulic fluid flowing to and returning from a specific hydraulic cylinder.

Fixed and supported on the chassis there is a reservoir 73 for hydraulic fluid. Integral with the reservoir there is the hydraulic pump and motor 70 (see FIG. 12). The manifold is connected to the hydraulic pump by means of a hydraulic supply pipeline 74 and hydraulic return line 75.

Figure 4:
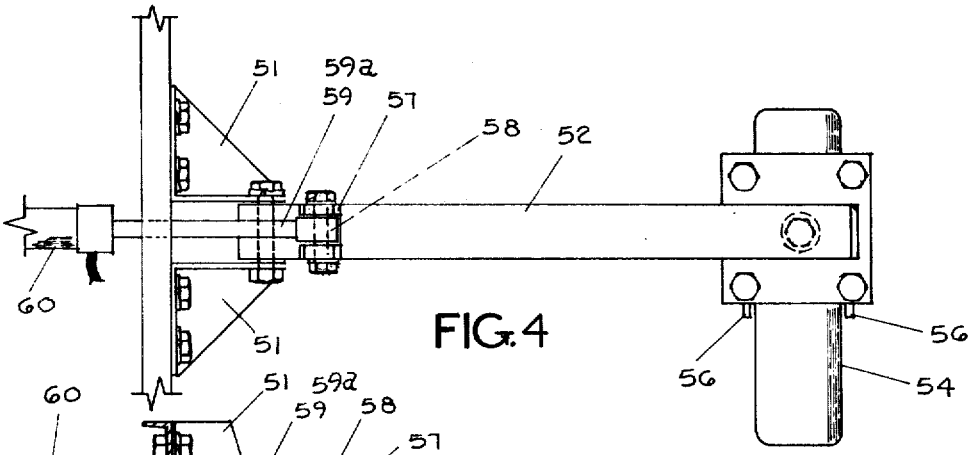
FIG. 4 is a fragmented top plan view of one of the stabilizing outriggers.
Figure 5:
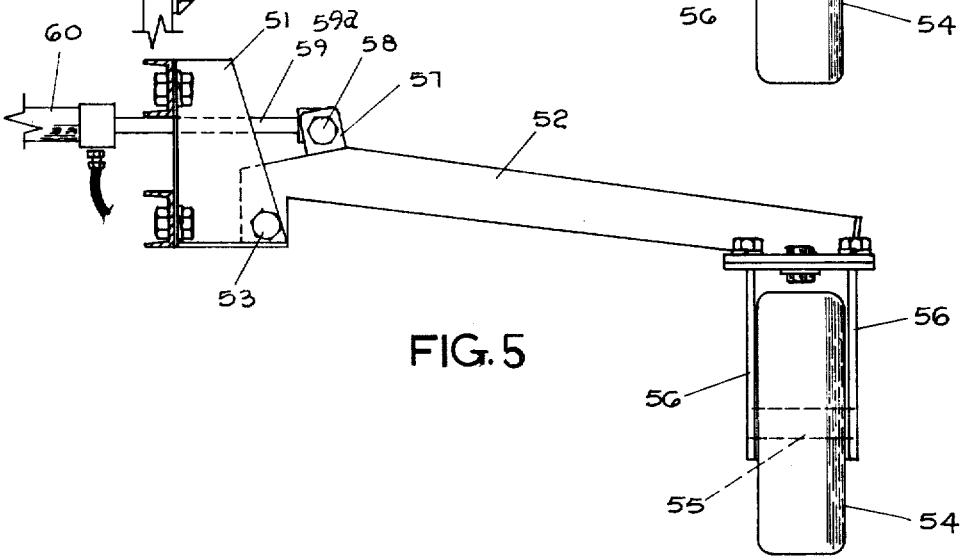
FIG. 5 is a fragmented side view in elevation of one of the stabilizing outriggers.
Figure 3:
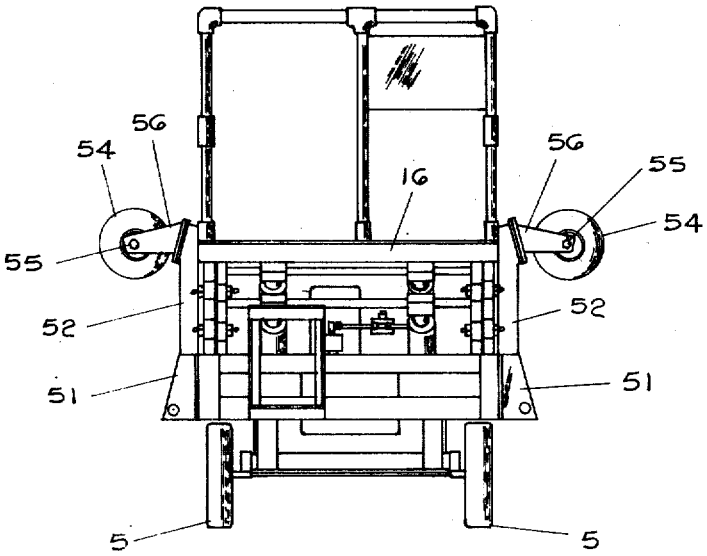
FIG. 3 is an end view in elevation showing the platform at its lowest level and the elevating mechanism in collapsed position.

Secured on each side of the chassis there are other angle brackets 51 (see FIGS. 4 and 5) spaced apart to form a slot for rotatably retaining arms 52 for right side and left side outriggers. The outriggers arms are rotatably secured on hinge pins 53 that are fixed in the angle brackets. Secured on outer ends of the arms there are outrigger rubber-tired wheels 54 rotatably secured on shafts 55 that are fixed in swiveled bifurcated bearing brackets 56 to allow the wheels to turn in the direction of travel. When the wheels are down in contact with the floor the platform is thereby secured from the swaying and/or tilting both in the down and elevated position.

Fixed on a top side of the arms of the outriggers there are pillow blocks 57 for the other hinge pins 58. Outrigger piston rods 59 for the left outrigger and 59a for the right outrigger have bifurcated ends 59b that are rotatably secured on the hinge pins 58 and the piston rods 59 are adapted to slide back and forth in outrigger hydraulic cylinders 60 and 60a that are fixed on the chassis. These hydraulic cylinders with the piston rods are the means for moving the outriggers up and down in relation to the chassis of the platform.

Figure 15:
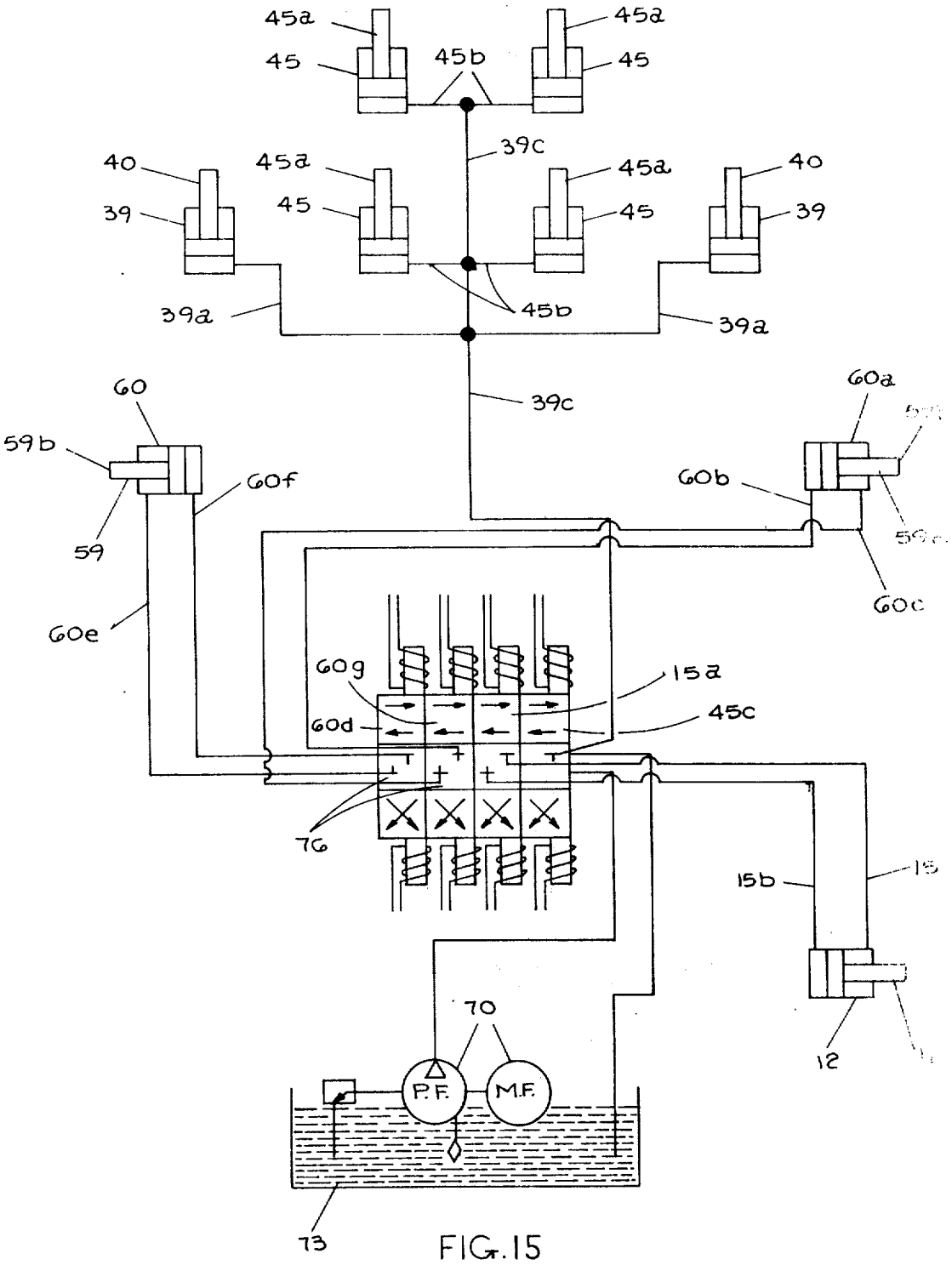
FIG. 15 is a diagrammatic illustration of a hydraulic system for elevating and lowering the platform with electric wiring leads shown in part to and from the electronically operated solenoid valves.

The right side outrigger cylinder 60a is connected to a solenoid-actuated valve 60g by means of hydraulic hoses 60b and 60c (see FIG. 15). The left side outrigger cylinder is connected to a solenoid-actuated valve 60d by means of hydraulic hoses 60e and 60f. Hydraulic pressure to the cylinders through the hoses 60b and 60c move the outriggers down and in contact with the floor. Pressure to the other end of the cylinders 60 through the hoses 60c and 60f raises the outriggers back up and away from the floor to up in a vertical position.

Figure 2:
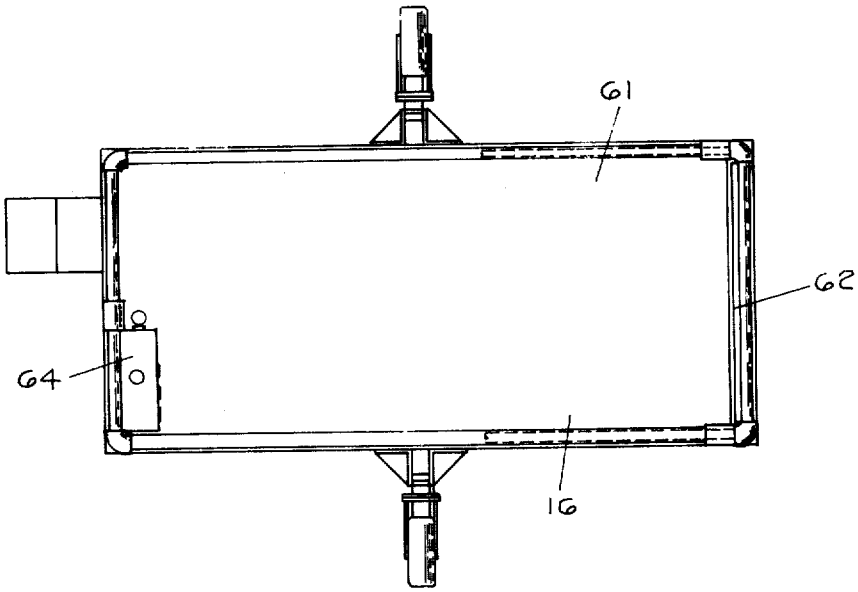
FIG. 2 is a top plan view FIG. 1 showing an extension for the platform folded back.
Figure 1:
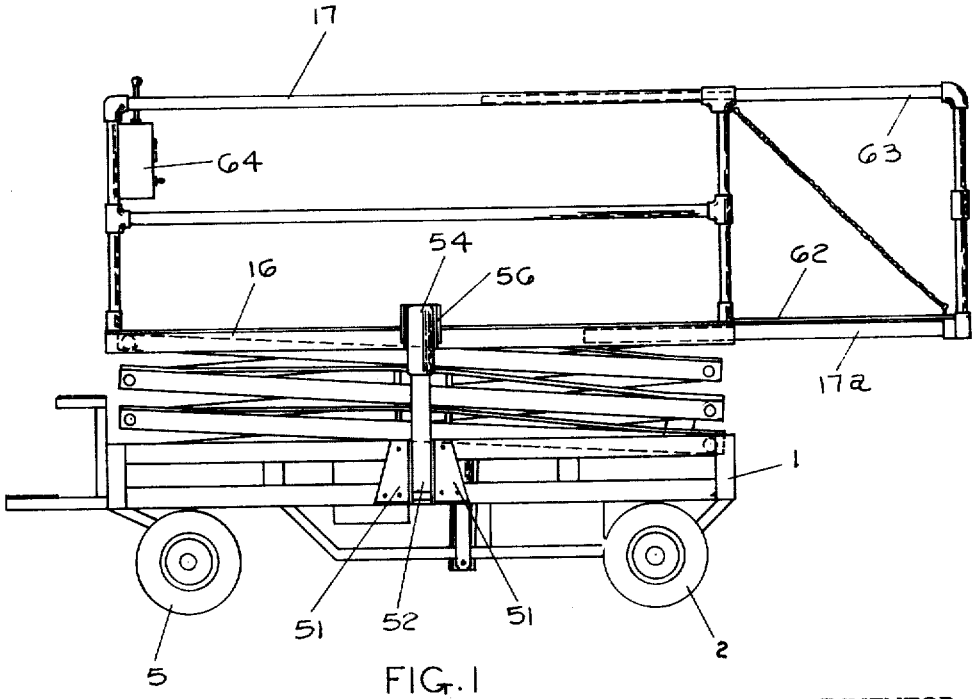
FIG. 1 is a side view in elevation showing the platform with its extension and the elevating mechanism in its lowest collapsed position.

A working surface 61 of a deck of the platform has a drop hinged section 62 to increase the working area of the deck when the section is down as illustrated in FIG. 1. The guardrails 17 are hollow and slidably secured and extendable guardrails 63 adapted to be slidably telescoped into the guardrails 17 when the drop hinge section is up as can be seen by referring to FIG. 2. Bottom rails 17a which support the section in down position are slidably secured in tubes secured to the bottom side of the platform.

Secured on the guardrail of the platform there is a pushbutton control box 64 (to be explained). A steering lever 65 tiltable right and left from upright is mounted in the top of the box. This lever controls the steering of the vehicle carrying the elevator platform when the platform is in elevated or lowered position. Mounted on the side of the pushbutton control box there is another tiltable drive motor control lever 66, that is adapted to be tilted back and forth in relation to the pushbutton control box for starting, accelerating, reversing and stopping the drive motor.

The rams for the hydraulic cylinders, that activate the outriggers and the steering mechanism, are adapted to reciprocate alternately in opposite directions. The solenoid-actuated valves are combined with entrical holding valves 76 that have two ball checks. The hydraulic lines are adapted to alternately become supply and/or return lines for the hydraulic fluid. When the hydraulic fluid is introduced into a line to make it a supply line under pressure the ball checks will be unseated and convert, the other line to a cylinder, into a return line. The conversion from supply to return lines and vice versa is controlled by the solenoid-actuated four-way valves. In every case when the lines are converted from supply lines to return lines the fluid in the return lines will return to the reservior 73 through the manifold and solenoid-actuated valves. See FIGS. 15 and 16 to correlate the electric circuits with the hydraulic systems.

There is a button for lowering the left outrigger and another separate button for raising the left outrigger. To move the outrigger down button 67 is depressed to close solenoid switch 67a and pump switch 67b. The switch 67a connects the circuit through the solenoid 67c into the main negative line 67d from a bank of multiple-cell storage batteries 71 which are removably supported on the chassis. The solenoid 67c when energized actuates the valve 60d allowing hydraulic fluid under pressure to flow through hydraulic hose line 60f. Simultaneously the hydraulic line 60e becomes a return line. This causes the piston 59 to move to the left rotating the left outrigger down onto the ground. The checks reseat themselves and hold the outrigger down onto the ground. Simultaneously with the depression of button 67 and closing of switch 67a to pump switch 68, for the left outrigger down motion, is closed. This switch is connected in series with a pump relay switch 79 which, when closed, completes the circuit to energize the pump motor 70 and operate the pump. Hydraulic fluid is then forced into the end of the hydraulic cylinder 60 for moving the outrigger down to the ground.

Figure 16:
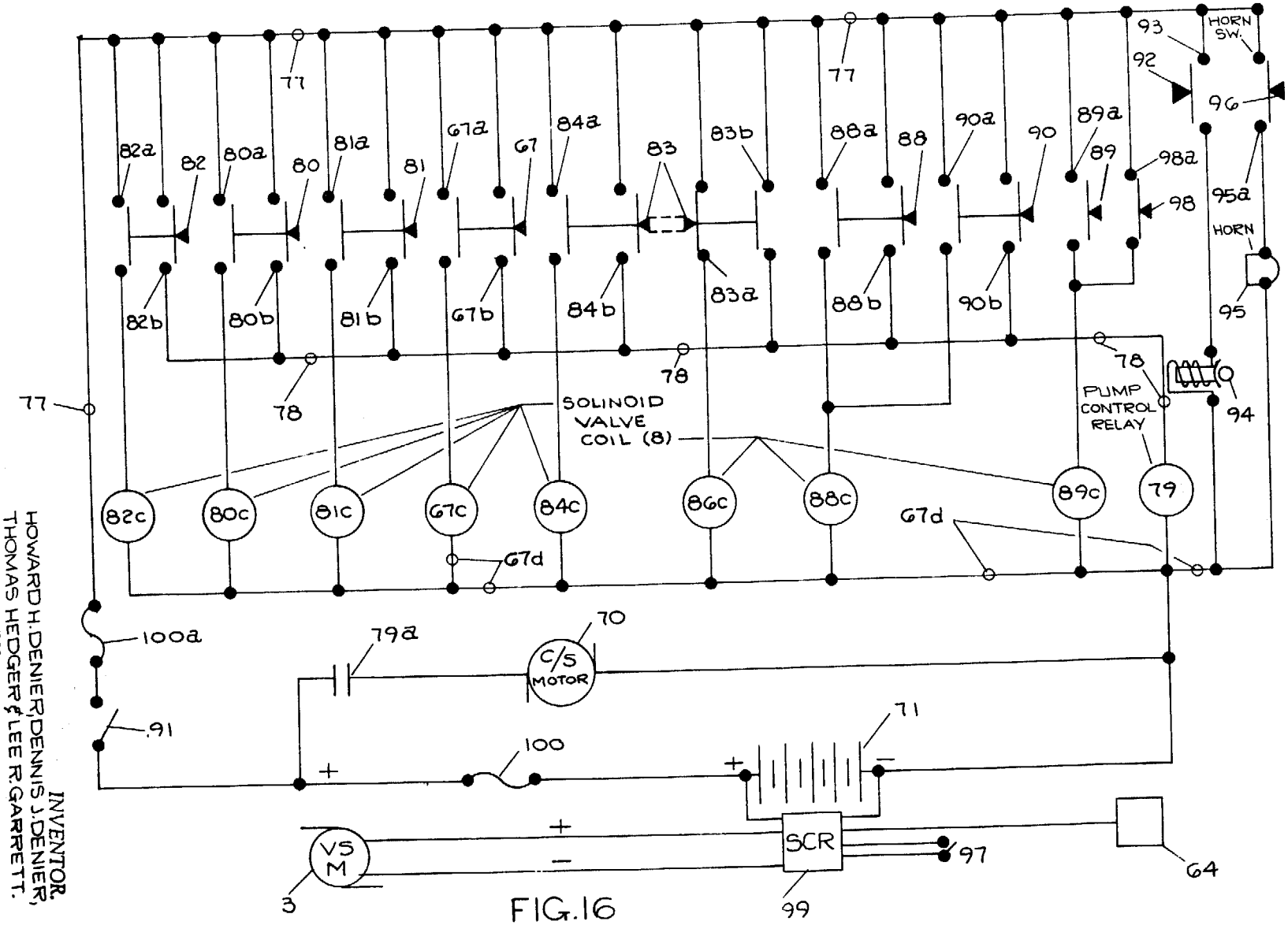
FIG. 16 is a diagram of electric wiring for energizing a hydraulic pump motor that drives a pump for circulating hydraulic fluid, together with the silicon-controlled rectifier for the motor driving the vehicle.

The electric circuit and the hydraulic system for the movement of the right outrigger down are identical to the left outrigger down except that it has its separate button 80, solenoid switch 80a, pump switch 80b, and solenoid 80c as illustrated in FIGS. 15 and 16.

For raising the left outrigger up there is a button 81 which, when depressed, closes a solenoid switch 81a and a pump motor switch 81b. The solenoid switch 81a, when closed, energizes the solenoid 81c through the common main negative line 67d. The 67d is connected to the bank of multiple-cell storage batteries 71. The pump motor switch 81b, when closed, energizes the pump relay 79, closing contact 79a to drive the hydraulic pump 70. This solenoid actuates the solenoid valve 60d, reversing the flow of the hydraulic fluid in hose line 60e which is now converted into a pressurized supply line, and line 60f becomes a return line. Pressure on the piston from the fluid through line 60e causes the piston 59 to move to the right and thereby raise the left outrigger up from the floor. The electric circuit and the hydraulic circuit for the movement of the right outrigger up are identical to the left outrigger up movement except that it has its separate button 82, solenoid switch 82a, pump switch 82b and solenoid 82c as illustrated in FIGS. 15 and 16.

The steering lever 65 is tiltable to the right and left of a vertical centerline through the axis supporting the lever. When the lever is tilted to the right the vehicle and the platform will gradually veer to the right and when the lever is tilted to the left the vehicle and the platform will gradually veer to the left. The steering lever actuates a reciprocable contact bar 83 (see FIG. 16) adapted to tilt to the right and close switches 83a 83b when the contact bar is tilted to the left it will close switches 84a and 84b. The lever is spring actuated to return it when it is released, to a position parallel to the vertical centerline. When the lever is in the vertical position parallel to the vertical centerline, all switches in the steering control circuit will be open. When the lever 83 is tilted for steering to the right the switch 83a is closed and a solenoid 86c is energized. When the solenoid is energized it actuates the valve 15a. Simultaneously the switch 83b is closed thereby energizing pump relay switch 79 and relay contact 79a starting the pump motor 70. The pump forces the hydraulic fluid under pressure into an end 12a of the steering cylinder through the hose line 15 thereby causing the rod 11 to move towards the end 12a of the steering cylinder. While the rod 11 is moving towards the end 12b, the steering wheels will be turned to the right and thereby turn the vehicle and platform to the right. Fluid in the end 12b of the steering cylinder will be returned to the reservoir 73 through the line 15b which in this case is a return line for the fluid. To steer the vehicle and platform to the left, the lever 83 is tilted to the left. Tilting the lever to the left closes switches 84 a and 84 b. The closing of the switch 84a energizes a solenoid 84c which in turn actuates the valve 15a. Simultaneously the switch 84b is closed and thereby energizes the pump relay switch 79 through the line 67a the common line connected to the negative side of the batteries. The contact 79a when closed energizes the motor 70 and drives the pump. The pump forces the hydraulic fluid under pressure into an end 12b of the steering cylinder through the hose line 15b thereby causing the rod 11 to move towards the end 12a of the steering cylinder. While the rod 11 is moving towards the end 12a of the cylinder, the steering wheels will be turned to the left and thereby turn the vehicle and platform to the left. The hydraulic fluid in the end 12a of the steering cylinder will return to the reservoir 73 through the hose line 15 which in this case is now a return line.

The platform is adapted to be raised and lowered and held at any level between the lowest and highest point of elevation of the platform. When a workman on the platform desires to raise the platform there is provided another pushbutton 88 in the pushbutton control box. When this pushbutton is depressed it will close switch 88a for energizing a solenoid 88c through line 67d. When the solenoid is energized it will actuate the valve 45c. Actuation of the valve 45c causes hydraulic fluid under pressure to flow into the hydraulic main line 39c. The fluid flows directly through branch connections to all primary booster cylinders 39 and also secondary cylinders 45. The pistons in the primary booster cylinders react to the pressure in advance of the pistons in the secondary cylinders. This advance reaction in the primary booster cylinders starts the upward movement of the lazy tongs. After the initial booster action the pistons for the secondary rams will react to the fluid pressure and all rams will act in unison and until the booster rams have reached their limits of upward motion. At this point the secondary rams will continue to move the platform upward to any desired height. Simultaneously with closing of switch 88a, pump motor relay 88b is also closed. Closing of pump motor relay 88b completes the circuit through the pump hydraulic relay 79 which then energizes the motor operating the pump to circulate the hydraulic fluid. A workman on the platform lowers the platform by depressing a button 89, which closes a switch 89a completing the circuit through and energizing a solenoid 89c. Energizing the solenoid 89c activates the valve 45c which returns the hydraulic fluid through the lines 39c and 45b from the cylinders 39 and 45 back to the reservoir. The weight of the platform on the secondary rams and the primary booster rams forces the fluid out of the cylinders and through the lines 39c and 45b.

Secured to the chassis there is a switchbox having pushbuttons 90 for elevating the platform and 98 for lowering the platform when a workman is on ground level and off of the platform. The button 90 closes switches 90a and 90b simultaneously thereby energizing the solenoid 88c. When the switches 90a and 90b are closed the cycle of operation will be the same as described for elevating the platform by the pushbutton 88 in the control box. When the button 98 is depressed, by a person of ground level, a switch 90a is closed and the solenoid 89c will be energized and operate valve 45c. When the switch 90a is closed the cycle of operation will be the same as described for lowering the platform by the use of the button 89 in the control box on the platform.

At any given height when the particular buttons 88, 90, 89 and 98 are released, the solenoids are deenergized and hold their respective valves in the neutral position. In this position all valve parts are closed and the hydraulic fluid is held in static condition and prevents the collapsing of the lazy tongs frames.

A key switch 91, across a main positive line 77, controls the on and off for all electric circuits including the drive motor for the vehicle. The positive line 77 connects to all circuits for the controls of the hydraulic system. A manually lockout-type button 92 opens and closes a switch 93 across the positive line 77 and negative line 67d.

The button is spring actuated and adapted to reciprocate to open and close the switch 93 for momentary braking the movement of the vehicle. To hold the vehicle in braked stationary position the button is depressed and latched to hold the switch 93 in closed condition. To release the vehicle from braked stationary position the button is unlatched thereby allowing it to spring outward and open the switch 93. Opening of the switch 93 deenergizes the electromagnet and releases the brake allowing the vehicle to become mobile. The closing of the switch 93 energizes a magnetic brake 94 that holds the vehicle with the platform from movement on level or sloping ground. This ensures that the vehicle will remain stationary when it is not propelled by the driving motor. All of the hydraulic systems can function notwithstanding that the magnetic brake is holding the vehicle and platform at rest. A warning horn 95 is controlled by a switch 95a that energizes the horn across the line 77 to line 67d. The horn is operated by a button 96 in the control box on the platform. A main power fuse 100 and another control fuse 100a are included in the electric circuit for overload protection.

Secured on the chassis there is a limit switch 97 with a lever 97a adapted to be detachably engaged by a lower arm of the lazy tongs when the lazy tongs are completely collapsed down onto the chassis of the vehicle. When the platform is raised a sufficient height to be disengaged from the arm of the lazy tongs the limit switch is opened. As long as the limit switch is open the speed of the drive motor remains retarded through the silicon-controlled regulator 99 and the vehicle with the platform in raised position can only be moved at a gradual pace. When the lazy tongs arm is in contact with the limit switch lever the limit switch is closed. Closing of the limit switch reacts through the silicon-controlled regulator 99 deenergizing the retarding electrodes and thereby allowing the driving motor to attain maximum speed to move the vehicle and platform at a greater pace.

The drive motor can only attain its maximum speed to move the vehicle at a greater pace when the platform is in its lowest down position.

Having described our invention we claim:

1. A lifting vehicle comprising:

a base member resting upon the ground and movable in a horizontal path;

a vertically movable platform disposed above said base member;

a compound lever system interconnecting the base member and platform operable in scissors fashion for raising and lowering the platform vertically relative to the base member at a selected horizontal location;

said compound lever system comprising a plurality of bar members pivotally connected together at the central portion thereof and having ends pivotally connected together;

said lever system having a lower bar member pivotally connected to the base member and having a companion lower bar member connected to the base member for longitudinal motion relative thereto, during the extending or collapsing motion of the compound lever system;

said compound lever system having an upper bar member pivotally connected to the said platform for pivotal movement and having a companion upper bar member connected to the platform for longitudinal motion relative to the platform during the extending or collapsing movement of the compound lever system;

upright rotatable primary power elements mounted on the base member and each having ram elements engageable with concave sockets supported on a portion of the lower companion bars of the compound lever system when the lever system is in the said collapsed position, thereby to provide a direct thrust for shifting the lever system initially from said collapsed position to a partially erected position;

a horizontal shaft extending transversely across the base member, said primary power elements having lower ends connected and secured to said shaft for pivotal motion of the power elements;

and a plurality of paired secondary power elements normally disposed at an acute angle to the base member for erecting the companion bars of the lever system from the said partially erected position;

a pair of said secondary power elements having lower ends pivotally connected to the lower ends of said bar members pivotally connected to said base member and having a ram pivotally connected to an intermediate portion of the compound lever system;

said paired secondary power elements to pivot from said acute angle toward an upright position and to extend the compound lever system to a predetermined height after the primary booster power elements have initially shifted the same from said collapsed position thereby to elevate said platform.

2. A lifting vehicle as set forth in claim 1 in which there is provided a pair of outrigger elements pivotally connected to opposite sides of the base member having swiveled wheels engageable with the ground for stabilizing the base member and platform when the platform is in said elevated position while stationary and in motion and respective hydraulic power elements interconnecting the outriggers with the vehicle chassis for raising or lowering the outriggers.

3. A lifting vehicle as set forth in claim 1 in which the primary booster power element and the secondary power element comprise hydraulic cylinders;

a hydraulic pressure system interconnecting the said cylinders and having a valve element for supplying and exhausting hydraulic pressure relative to the said cylinders for raising and lowering the platform.

4. A lifting vehicle as set forth in claim 1 in which the primary booster power element and the secondary power element comprise hydraulic cylinders;

a hydraulic pressure system connected with said cylinders in common;

said hydraulic system having a valve element for supplying hydraulic pressure to said booster cylinder and secondary cylinder simultaneously, and;

the ram element of said booster cylinder providing a substantially initial greater thrust than the ram of the secondary cylinders but providing a shorter working stroke, and;

the rams of the secondary cylinders being effective to continuing the extending of the compound lever system to said predetermined height after the ram of the booster cylinder has reached the end of said working stroke.

5. A self-propelled lifting *apparatus* [vehicle] comprising:

a wheeled vehicle having a set of wheels including dirigible wheels for guiding the horizontal path of motion of the vehicle;

a power motor on said vehicle for driving the said wheels thereby to move the vehicle in a horizontal path;

control means for regulating the operation of the power motor of the vehicle;

power means connected to said dirigible wheels for guiding the vehicle;

a vertically movable platform disposed above the vehicle;

a pair of extensible lazy tongs connecting the vehicle and platform for raising and lowering the platform vertically relative to the vehicle at a selected horizontal location;

each lazy tong having pairs of intermediate bars pivotally connected together at the central portion thereof and the bars having outer ends pivotally connected together and constituting frames;

said lazy tongs having a lower frame, the bars of which have one end pivotally connected to the vehicle at opposite sides and an opposite end shiftably connected to the vehicle at opposite sides for longitudinal motion relative to the vehicle during the extending or collapsing motion of the lazy tongs frames;

said lazy tongs having an upper frame, the bars of which have one end pivotally connected to the said platform at opposite sides and having an opposite end shiftably connected to the platform at opposite sides for longitudinal motion relative to the platform for extending or collapsing movement of the lazy tongs frames;

a pair of primary power elements mounted on the vehicle, each having a thrust element engageable with the said lower frame of the lazy tongs when the frame is in a collapsed position, thereby to provide a direct thrust for shifting the lazy tongs initially from said collapsed position to a partially erected position;

a first pair of secondary power elements having lower ends pivotally *mounted to react in opposition* [connected] to the *vehicle* [chassis] and having extensible thrust elements pivotally connected to one of said intermediate lazy tongs frames;

and a second pair of secondary power elements having lower ends pivotally connected to one of said intermediate lazy tongs frames and having thrust elements pivotally *mounted to react in opposition* [connected] to said platform;

said secondary power elements operable to extend the said lazy tongs frames to a predetermined height after the primary power elements have initially lifted the frames from said collapsed position, thereby to elevate the platform.

6. A lifting vehicle as set forth in claim 5 in which the frames of the lazy tongs each comprise duplicate pairs of levers and in which there is provided crossmembers extending across the pivoted outer ends of the bars which constitute the lazy tongs frames to stabilize the lazy tongs.

7. A lifting vehicle as set forth in claim 5 in which the frames of the lazy tongs each comprise duplicate pairs of levers and in which there is provided crossmembers extending across the pivoted outer ends of the bars which constitute the lazy tongs frames to stabilize the lazy tongs;

said vehicle having a pair of inwardly facing channel members at opposite sides thereof, the ends of the bars of the lower frame, which are shiftably connected to the vehicle having roller elements on said crossmembers;

said rollers interfitted within said channels for longitudinal movement thereof relative to the vehicle as the lazy tongs frames are extended or collapsed.

8. A self-propelled lifting vehicle as set forth in claim 5 in which the power means which is connected to said dirigible wheels for guiding the vehicle comprises a hydraulic cylinder connected to the vehicle and having a piston including a piston rod connected to the dirigible wheels, a hydraulic pressure system, and a control valve connected to the cylinder for admitting and exhausting hydraulic pressure relative to the opposite ends of the cylinder.

9. A self-propelled lifting *apparatus* [vehicle] comprising:

a wheeled vehicle having *a chassis and* a set of wheels for guiding the horizontal path of motion of the vehicle;

a drive motor on said chassis for driving the said wheels thereby to propel the chassis in a horizontal path;

a control for said motor for regulating the motion of the vehicle;

a hydraulic steering cylinder having a piston rod connected to said dirigible wheels for guiding the vehicle;

a vertically movable platform disposed above the vehicle;

a pair of extensible lazy tongs connecting the vehicle and platform for raising and lowering the platform vertically relative to the chassis at a selected horizontal location;

said lazy tongs having pairs of intermediate bars pivotally connected together at the central portion thereof, the bars having outer ends pivotally connected together and constituting frames;

said lazy tongs having a lower frame, the bars of which have one end pivotally connected to the vehicle at opposite sides, and an opposite end shiftably connected to the vehicle at opposite sides for longitudinal motion relative thereto for extending or collapsing the lazy tongs;

said lazy tongs having an upper frame, the bars of which have one end pivotally connected to the said platform at opposite sides for pivotal movement and having an opposite end shiftably connected to the platform for extending or collapsing movement of the lazy tongs;

a pair of primary booster cylinders mounted on the chassis, each having a ram element engageable with the lower frame of the lazy tongs when the lower frame is in the said collapsed position, thereby to provide a direct thrust for shifting the lower lazy tongs frame initially from said collapsed position to a partially erected position;

a first pair of secondary cylinders having their lower ends pivotally connected to the *lower frame* [chassis] and having a ram pivotally connected to one of said intermediate lazy tongs frames;

a second pair of secondary cylinders having their lower ends pivotally connected to said intermediate lazy tongs frames and their rams pivotally connected to said *upper frame* [platform] ;

said secondary cylinders operable to extend the said frames to a predetermined height after the primary booster cylinder has initially lifted the frames from said collapsed position, thereby to elevate the platform;

a hydraulic pressure system for supplying and exhausting hydraulic pressure relative to the several hydraulic cylinders;

and an electrical control system including electrically operated valves for controlling the said hydraulic system, thereby to regulate the operation of the self-propelled lifting vehicle and platform.

10. A self-propelled lifting vehicle as set forth in claim 9 in which there is provided a source of electrical energy, a drive motor mechanically interconnected with the wheels of the vehicle for driving the same, a shiftable steering lever electrically interconnecting the drive motor with the electrical energy, said lever being shiftable from a neutral position to a forward or reverse position and thereby energizing the motor in forward or reverse directions in response to the direction of movement of the shiftable steering lever.

11. A self-propelled lifting vehicle as set forth in claim 9 in which there is provided a source of electrical energy, a drive motor mechanically interconnected with the wheels of the vehicle for driving the same, a shiftable steering lever electrically interconnecting the drive motor with the electrical energy, said lever being shiftable from a neutral position to a forward or reverse position and thereby energizing the motor in forward or reverse direction in response to the direction of movement of the shiftable steering lever;

an electrically operated brake in operative connection with the said drive motor, and an electrical switch interconnecting the said electrical energy and electrically operated brake for applying the brake to hold the vehicle and platform in a stationary position.

12. A self-propelled lifting vehicle as set forth in claim 9 in which there is provided a source of electrical energy, said operated drive motor mechanically interconnected with the wheels of the vehicle for driving the same, a shiftable lever interconnecting the drive motor with the source of electrical energy for driving the motor in forward or reverse directions, said hydraulic control system having an electrically operated valve for regulating the operation of the steering cylinder, said electrical control circuit including sets of steering contacts interconnected with the electrically operated valve, and a second shiftable lever for alternately closing said steering contacts for energizing the valve and admitting hydraulic pressure to the steering cylinder in forward or reverse direction for guiding the path of motion of the vehicle.

13. A self-propelled lifting vehicle as set forth in claim 9 in which there is provided a source of electrical energy, said operated drive motor mechanically interconnected with the wheels of the vehicle for driving the same;

a shiftable lever interconnecting the drive motor with the source of electrical energy for energizing the motor in forward or reverse directions, said electrical control circuit including a directional steering lever interconnected with the electrically operated valve of the steering cylinder for admitting hydraulic pressure to the cylinder in forward or reverse direction for guiding the path of motion of the vehicle;

said steering lever guiding the vehicle in a direction corresponding to the direction of movement of the steering lever;

said steering lever having a neutral position in which the electrically operated valve shifts the steering cylinder to a neutral position for guiding the vehicle in a straight path of motion.

14. A self-propelled lifting vehicle as set forth in claim 9 in which there is provided a limit switch mounted relative to the vehicle and platform, said limit switch having contacts interconnected with the electrical control circuit and actuated by the platform, said contacts retarding the speed of operation of the drive motor when the platform is in its raised position.

15. A self-propelled lifting vehicle as set forth in claim 9 in which there is provided a limit switch mounted relative to the vehicle chassis and platform, said limit switch having contacts interconnected with the electrical control circuit and actuated by the platform in the lowered position thereof;

a source of electrical energy for the said drive motor which propels the vehicle;

means interconnecting the drive motor and source of electrical energy for energizing the motor in forward or reverse directions or for deenergizing the motor;

said electrical control circuit having control means interposed in the source of electrical energy for regulating the speed of the drive motor;

said limit switch coacting with the control means to retard the speed of operation of the drive motor when the platform is raised slightly from the lowest collapsed position.

16. A self-propelled lifting vehicle as set forth in claim 9 in which the hydraulic control system includes electrically operated hydraulic valves and in which the electrical control system includes switches electrically interconnected with the respective electrically operated valves, said valves interconnecting the hydraulic control system respectively with the said hydraulic primary booster cylinder, the hydraulic secondary cylinders of the intermediate lazy tongs frames for raising and lowering the platform.

17. A self-propelled lifting vehicle as set forth in claim 9 in which the hydraulic control system includes electrically operated hydraulic valves and in which the electrical control system includes switches electrically interconnected with the respective electrically operated valves, said valves interconnecting the hydraulic control system respectively with the said hydraulic primary booster cylinder, the hydraulic secondary cylinders of the intermediate lazy tongs frames for raising and lowering the platform;

said hydraulic system including means for hydraulically locking the rams of said cylinders for supporting the platform at a selected elevation.

18. A self-propelled lifting vehicle as set forth in claim 9 in which the hydraulic system includes electrically operated hydraulic valves and in which the electrical control system includes switches electrically interconnected with the respective electrically operated valves;

said valves interconnecting the hydraulic control system with said hydraulic primary booster cylinders and the hydraulic secondary cylinders for raising and lowering the platform upon operation of the switches;

said electrical control system including an electrical control device for regulating the supply of hydraulic pressure to the steering cylinder for controlling the direction of motion of the vehicle chassis and its platform with the platform in its raised or lowered position.

19. A self-propelled lifting vehicle as set forth in claim 9 in which the hydraulic system includes electrically operated hydraulic valves and in which the electrical control system includes switches electrically interconnected with the respective electrically operated valves;

said valves interconnecting the hydraulic control system with the said hydraulic primary booster cylinders and the hydraulic secondary cylinders for raising and lowering the platform upon operation of the switches;

said electrical control system including an electrical switch for regulating the supply of hydraulic pressure to the steering cylinder for controlling the direction of motion of the vehicle chassis and its platform with the platform in its raised or lowered position;

said hydraulic system having a motor driven hydraulic pump;

said electrical control system arranged to energize the motor of said hydraulic pump to provide hydraulic pressure when any one of said electrical switches are closed.

20. A self-propelled lifting vehicle as set forth in claim 9 in which there is provided a pair of outriggers pivotally connected to the opposite sides to the vehicle and engageable with the ground, respective hydraulic cylinders for raising or lowering the outriggers, the hydraulic control system having electrically operated hydraulic valves and the electrical control system having switches electrically interconnecting with the respective electrically operated hydraulic valves;

said valves interconnecting the hydraulic control system respectively with said hydraulic outrigger cylinders for raising and lowering the outriggers selectively.

21. A self-propelled lifting vehicle as set forth in claim 9 in which each primary booster cylinder is mounted relative to the platform and vehicle and includes an outwardly projecting ram, the outer end of said ram having a thrust element mounted thereon, coacting element arranged for engagement by the thrust element of the ram when the ram of the booster cylinder is extended, thereby initially lift the platform from the lowered position thereof to a predetermined elevation, said coacting thrust elements providing disengagement there between when the secondary cylinders of the intermediate lazy tongs frames lift the platform toward said predetermined elevation.

22. A self-propelled lifting vehicle as set forth in claim 9 in which each primary booster cylinder is mounted upon the vehicle and includes an upwardly projecting ram, the upper end of said ram having ball element mounted thereon, one of said lazy tongs frames having a socket element arranged for thrust engagement by the ball elements of the ram when the ram of the booster cylinder is elevated, thereby to initially lift the platform from the lowered position thereof to a predetermined elevation, said ball and socket elements providing disengagement there between when the secondary cylinders of the intermediate lazy tongs frames lift the platform toward said predetermined elevation.

23. A self-propelled lifting vehicle as set forth in claim 9 in which each primary booster cylinder is pivotally mounted upon the vehicle and includes stop means for holding the cylinder in an upright position;

an upwardly projecting ram, the upper end of said ram having a ball element mounted thereon;

one of said lazy tongs frames having a socket element arranged for thrust engagement by the ball element of the ram when the ram of the booster cylinder is elevated, thereby to initially lift the platform from the lowered position thereof toward a predetermined elevation;

said pivotally mounted booster cylinder pivoting in an arc in response to the arcuate motion of the lazy tongs frames as the frames lift the platform from said collapsed position toward said predetermined elevation;

spring means providing said pivotal motion of the booster cylinder;

said spring means pivoting the booster cylinder back to said upright position against the stop means upon disengagement of the said ball element from the socket element as the secondary cylinders elevate the platform toward the said predetermined elevation.

24. A self-propelled lifting vehicle as set forth in claim 9 in which the vehicle is propelled by banks of electrical storage batteries;

said batteries being interconnected with the drive motor for propelling the vehicle and also being interconnected with the electrical control circuit for energizing the same;

said batteries being mounted upon the vehicle, whereby the weight load of the storage batteries act as a ballast to stabilize the vehicle when the said platform is in its elevated position.

*25. A self-propelled lifting vehicle including a chassis, a set of wheels on the chassis to permit movement along a horizontal path of motion, a power motor on the vehicle chassis to power the vehicle along the path of motion, power means connected to the vehicle wheels for guiding the vehicle along the path of motion, wherein the improvement comprises:*

*a vertically movable platform assembly disposed above the vehicle chassis;*

*control means for regulating the operation of the power motor and the power means, said control means being disposed on said vertically movable platform and operable to regulate the power motor and the power means even while the platform is elevated above the vehicle chassis;*

*a pair of extensible lazy tongs interconnecting the vehicle and said platform for raising and lowering said platform vertically relative to said vehicle chassis, each lazy tong including pairs of bars pivotally connected together at the central portion thereof, each said pair of pivotally connected bars comprising a frame, said lazy tongs each having at least two frames;*

*a primary power element mounted on the vehicle chassis and controllable from said platform, said primary power element having a thrust element engageable with said tongs at a position intermediate the connection between said tongs and said vehicle chassis and the connection point between said tongs and said platform, said primary power element being engageable with said tongs when said tongs are in a collapsed ing the tongs from a collapsed position where said platform is adjacent the chassis to a partially erected position where said platform is elevated above the chassis;*

*a secondary power element controllable from said platform and pivotally connected at its lowermost end to one said frame of said lazy tongs and pivotally connected at the upper end of said secondary power element to another frame disposed above said one frame, said secondary power element being operative to extend said tongs from said partially erect position to further elevate said platform.*

*26. The lifting vehicle as set forth in claim 25 wherein said secondary power element comprises a pair of power elements having the lower end of each power element pivotally attached to a bar of said tongs at a point substantially adjacent the connection between said tongs and said vehicle chassis.*

*27. The lifting vehicle as set forth in claim 25 wherein said control means includes means to reduce the maximum speed obtainable by the power motor when said platform is disposed above the vehicle chassis.*

*28. The lifting vehicle as set forth in claim 25 wherein said platform includes a section secured to the platform for increasing the platform working area when disposed in co-planar relation with said platform.*

*29. The lifting vehicle as set forth in claim 25 wherein the primary power element is pivotally mounted on the vehicle chassis thereby providing a greater height above the vehicle chassis for said partially erected position.*

*30. The lifting vehicle as set forth in claim 25 wherein the control means includes a silicon controlled rectifier for controlling the power motor.*

*31. The lifting vehicle as set forth in claim 25 additionally including a pair of outriggers pivotally connected to opposite sides of the chassis, each said outrigger being vertically movable between a ground contacting position and a non-contacting position, the vertical movement of said outriggers being controllable from said platform.*

*32. A self-propelled lifting vehicle including a chassis, a set of wheels on the chassis to permit movement along a horizontal path of motion, a power motor on the vehicle chassis to power the vehicle along the path of motion, power means connected to the vehicle wheels for guiding the vehicle along the path of motion, wherein the improvement comprises:*

*a vertically movable platform disposed above the vehicle chassis;*

*control means for regulating the operation of the power motor, said control means being disposed on said vertically movable platform;*

*a pair of extensible lazy tongs connecting the vehicle and the platform for raising and lowering the platform vertically relative to the vehicle chassis;*

*each lazy tong having a plurality of pairs of bars pivotally connected together at the central portion thereof and constituting frames;*

*the vehicle chassis, said tongs and said platform comprising a lifting assembly;*

*a primary power element mounted on the vehicle and controllable from said platform, said power element having a thrust element engageable with said tongs when the tongs are in a collapsed position thereby to provide a direct thrust for shifting the tongs from said collapsed position to a partially erected position;*

*a first secondary power means having its lower end pivotally attached substantially to the lower end of said lifting assembly and its upper end pivotally attached to said tongs at a point intermediate said vehicle chassis and said platform; and*

*a second secondary power means having its lower end pivotally connected to said tongs at a point intermediate said vehicle chassis and said platform and its upper end pivotally attached to the upper end of said lifting assembly thereby to provide with said first and said second secondary power means the thrust for shifting the tongs from said partially erected position to a fully erected position, said first and second sec-*

*ondary power means being controllable from said platform.*

*33. A self-propelled lifting vehicle including a chassis, a set of wheels on the chassis to permit movement along a horizontal path of motion, a power motor on the vehicle chassis to power the vehicle along the path of motion, power means connected to the vehicle wheels for guiding the vehicle along the path of motion, wherein the improvement comprises:*

*a vertically movable platform disposed above the vehicle chassis;*

*control means for regulating the operation of the power motor, said control means being disposed on said vertically movable platform and operable to regulate the power motor even when the platform is disposed above the vehicle chassis;*

*a pair of extensible lazy tongs connecting the chassis and the platform for raising and lowering the platform vertically relative to the chassis;*

*each lazy tong having pairs of bars pivotally connected together at the central portion thereof and the bars having outer ends pivotally connected together and constituting frames;*

*said lazy tongs having a lower frame, the bars of which have one end pivotally connected to the chassis at opposite sides and an opposite end shiftably connected to the chassis at opposite sides for longitudinal motion relative to the chassis during extending or collapsing motion or the lazy tongs;*

*said lazy tongs having an upper frame, the bars of which have one end pivotally connected to said platform at opposite sides and having an opposite end shiftably connected to the platform at opposite sides for longitudinal motion relative to the platform during extending or collapsing movement of the lazy tongs;*

*a pair of primary power elements mounted on the chassis and controllable from said platform, each having a thrust element engageable with said lower frame of the lazy tongs when the tongs are in a collapsed condition thereby to provide a direct thrust for shifting the lazy tongs initially from the collapsed to a partially erected position.*

*a first pair of secondary power elements having lower ends pivotally connected to said lower frame at a point substantially adjacent the connection between said lower frame and the vehicle chassis and having extensible thrust elements pivotally connected to another of said frames;*

*a second pair of secondary power elements having lower ends pivotally connected to a frame other than said upper frame and having thrust elements pivotally connected to said upper frame at a point substantially adjacent the connection between said upper frame and said platform;*

*said secondary power elements being controllable from said platform and operable to extend said lazy tongs to a predetermined height after the primary power elements have initially lifted the tongs to said partially erected position.*

* * * * *

UNITED STATES PATENT OFFICE

CERTIFICATE OF CORRECTION

PATENT NO. : Re. 28455

DATED : July 1, 1975

INVENTOR(S) : Howard H. Denier et al

It is certified that error appears in the above-identified patent and that said Letters Patent are hereby corrected as shown below:

Col. 1, line 3, "beween" should be -- between --

Col. 15, line 53, after "collapsed," insert

-- condition thereby to provide a direct thrust for shift --

Col. 17, line 29, "or" should be -- of --

Signed and Sealed this

*twenty-eight* Day of *October 1975*

[SEAL]

*Attest:*

RUTH C. MASON
*Attesting Officer*

C. MARSHALL DANN
*Commissioner of Patents and Trademarks*